United States Patent [19]
Winkelmann

[11] 3,770,990
[45] Nov. 6, 1973

[54] CLEARANCE TAKE UP BEARING ASSEMBLY

[75] Inventor: Herbert E. Winkelmann, Kettering, Ohio

[73] Assignee: General Motors Corporation, Detroit, Mich.

[22] Filed: Aug. 21, 1972

[21] Appl. No.: 282,416

[52] U.S. Cl. .................................................. 308/72
[51] Int. Cl. .............................................. F16c 23/00
[58] Field of Search ..................... 208/72, 62, 63, 58

[56] References Cited
UNITED STATES PATENTS
1,038,006   9/1912   Shaw..................................... 308/62

Primary Examiner—Charles J. Myhre
Assistant Examiner—Frank Susko
Attorney—W. E. Finken et al.

[57] ABSTRACT

This disclosure relates to a clearance take up bearing assembly for an armature shaft of a dynamoelectric machine. The bearing assembly has a bearing housing with axially spaced retainer means defining a partially enclosed bearing cage. The bearing assembly also includes a split-ring, bearing which has two members. The members have eccentric annular openings with diameters larger than the diameter of the shaft and adjacent, inclined sides which define cam surfaces. The members are normally loosely retained axially and radially within radially retainer means with their cam surfaces in abutting engagement and with their annular openings axially misaligned. One of the members normally supports the lower portion of the shaft within its annular opening and the other of the members, which also has the shaft received within its annular opening, normally rests upon the upper portion of the shaft for rotation thereof. The one member is rotated relative to the other member upon rotation of the shaft, whereupon the members are moved axially apart by the cam surfaces and the support means of the bearing housing restrains the members axially and readially and urges the members into engagement with the different circumferential portions of the shaft to radially support the shaft during rotation thereof.

2 Claims, 5 Drawing Figures

PATENTED NOV 6 1973

3,770,990

CLEARANCE TAKE UP BEARING ASSEMBLY

The present invention relates to bearing assemblies for rotatable shafts, and more particularly to a bearing assembly for rotatable shafts of dynamoelectric machines which automatically take up radial clearance between itself and the shaft upon rotation of the shaft in order to prevent radial movement or play of the shaft.

Because of the variance within tolerance limitations in the dimensions of the armature shafts of dynamoelectric machines and radial support bearings for such shafts, it is desirable that radial support bearings be adjustable to compensate for these variations so that the armature shaft is radially engaged and suppported by the bearing to prevent radial play of the shaft. Heretofore, split, plain bearing assemblies have been provided with manual means for adjustment of the bearing to the diameter size of rotatable shafts. For example, see U. S. Pat. Nos. 903,872; 1,361,471; 2,093,521; 2,766,078; and 3,009,747. Further, split-ring, plain bearing assemblies have also been provided with automatic clearance take up means generally in the form of a spring biased cam independent of the bearing. For example, see U. S. Pat. Nos. 1,825,410; 3,361,458; and 3,374,038.

In accordance with the provisions of the present invention, a new and improved self-adjusting bearing assembly is provided to automatically take up any radial play of a rotatable shaft, such as an armature shaft of a dynamoelectric machine. Accordingly, it is an object of the present invention to provide a new and improved clearance take up bearing assembly for a rotatable shaft, such as an armature shaft of a dynamoelectric machine and wherein the bearing assembly includes a split-ring bearing which engages the rotatable shaft positioned therein at different circumferential portions in response to rotation of the shaft to provide radial support for the shaft during rotation thereof and prevent radial play of the shaft.

Another object of the present invention is to provide a new and improved clearance take up bearing assembly for an armature shaft of a dynamoelectric machine, as described in the preceding object, and which comprises a bearing housing with axially spaced retainer means defining a partially enclosed bearing cage, a split-ring bearing having two members with eccentric annular openings oversize with respect to the shaft and where the members have adjacent inclined sides defining cam surfaces, the members being normally loosely retained axially and radially between the retainer means with their cam surfaces in abutting engagement and with their annular openings axially misaligned, and wherein one of the members normally supports the lower portion of the shaft within its annular opening and the other of the members normally rests upon the upper portion of the shaft, and with the one member being rotated relative to the other member upon rotation of the shaft and the members being moved axially apart by the cam surfaces whereupon the support means of the bearing housing restrains the members axially and radially and the members are urged into engagement with different circumferential portions of the shaft to radially support and prevent radial play of the shaft during rotation thereof.

These and other objects of the present invention are accomplished in a preferred embodiment of a clearance take up bearing assembly for an armature shaft of a dynamoelectric machine which comprises a cylindrical, annular bearing housing which is supported within the housing of the machine. The bearing housing includes a pair of axially spaced retainer rings which are circumferentially retained and which define a bearing cage. Each retainer ring has a plurality of radially inwardly extending fingers with arcuately formed tip portions. The bearing assembly further comprises a split-ring, plain bearing generally spherical in shape and having two members with eccentric annular openings therethrough oversized with respect to the shaft and through which the shaft is received. Each of the two members has a flat, inclined side defining a cam surface. The two members are loosely supported axially and radially between the retainer rings with the cam surfaces in complementary engagement and their annular openings misaligned axially. One of the members supports the lower portion of the shaft within its annular opening before rotation of the shaft and the other of the members rests upon the upper portion of the shaft. The one member is rotated relative to the other member upon rotation of the shaft and the cam surfaces cooperate to move the members axially apart whereupon the retainer rings restrain the members axially and radially and urge the members into engagement with substantially opposite circumferential portions of the shaft in order to radially support and prevent radial play of the shaft during rotation thereof.

These and other objects of the present invention will become more fully apparent from the following detailed description and drawings wherein.

Figure 3:
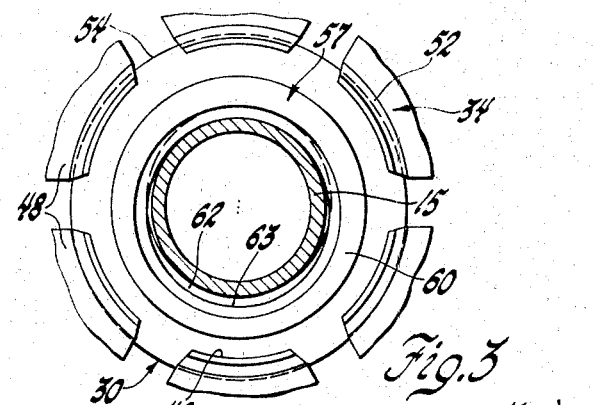
FIG. 3 is a cross-sectional view taken along line 3—3 of FIG. 2.

As representing a preferred embodiment of the present invention, the drawing shows a conventional dynamoelectric machine 10 having a housing 12 and an armature 14 with a rotatable armature shaft 15 which has its opposite ends radially supported within a pair of clearance take up bearing assemblies 18. It should be understood that the use of the clearance take up bearing assemblies of the present invention is no way limited to dynamoelectric machines and that it could be employed in different types of devices having rotatable shafts radially supported in bearing assemblies.

The housing 12 is a two-piece, generally cylindrical assembly having first and second members 20 and 21 which enclose the working portions of the dynamoelectric machine 10. Both members 20 and 21 of the housing 12 have an end portion 23, side walls 24, and flanges 26 which extend radially outwardly from the side walls 24 and which are abutted and fastened to each other by any suitable mechanical means. Both of the members 20 and 21 include axially extending, cylindrical openings 28 within their end portions 23 which receive therein the clearance take up bearing assemblies 18 of the present invention.

The clearance take up bearing assembly 18 of the present invention broadly comprises a split-ring, plain bearing 30, a bearing housing 32 and a retainer means 34.

Figure 1:
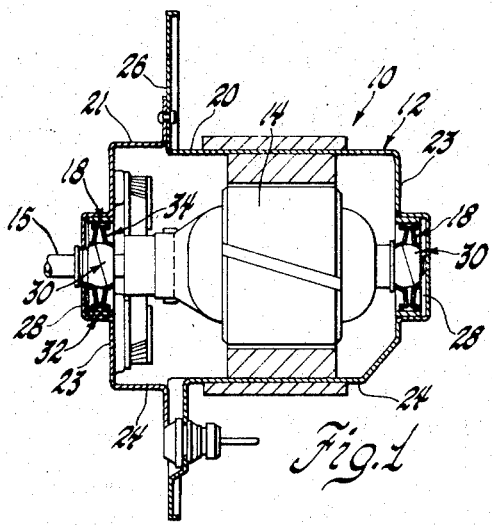
FIG. 1 is a cross-sectional elevational view of a dynamoelectric machine embodying the present invention.
Figure 4:
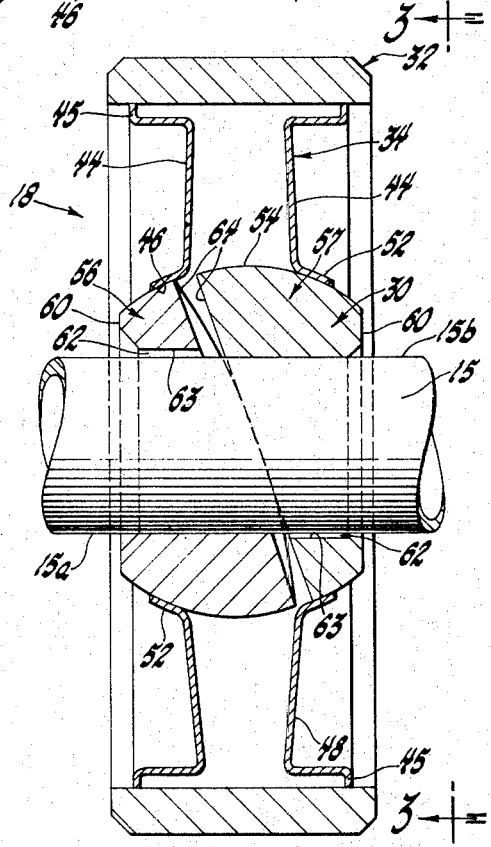
FIG. 4 is a view similar to FIG. 2 but with different parts in different positions.
Figure 2:
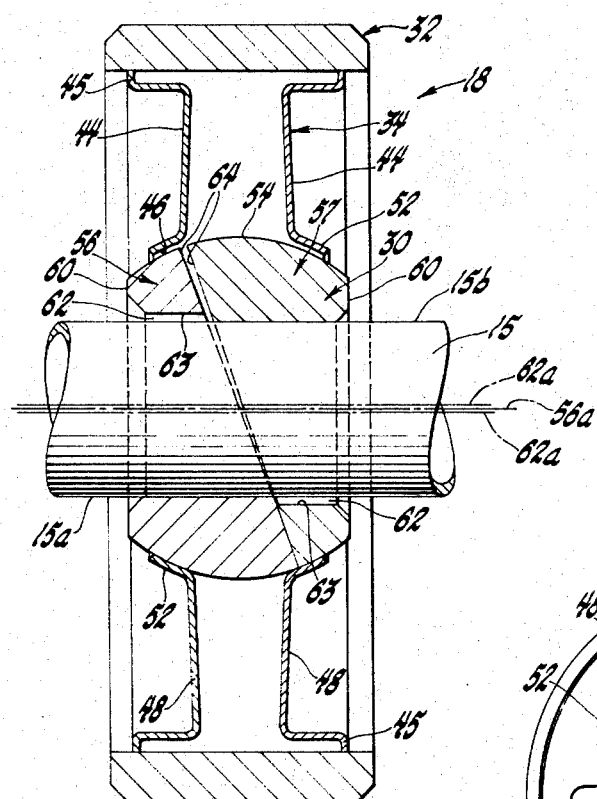
FIG. 2 is a cross-sectional elevational view of the clearance take up bearing of the present invention.

Referring to FIG. 2, the bearing housing 32 of the bearing assembly 18 is an annular, cylindrical member or ring which is generally complementary in shape with the opening 28 in the end portion 23 of the housing 12. With reference to FIG. 1, and as was previously described, the bearing assemblies 18 are received within the openings 28 in the end portions 23 of the housing 12 and the bearing housing 32 can be retained therein in any suitable or conventional manner such as by a force or friction fit.

Figure 5:
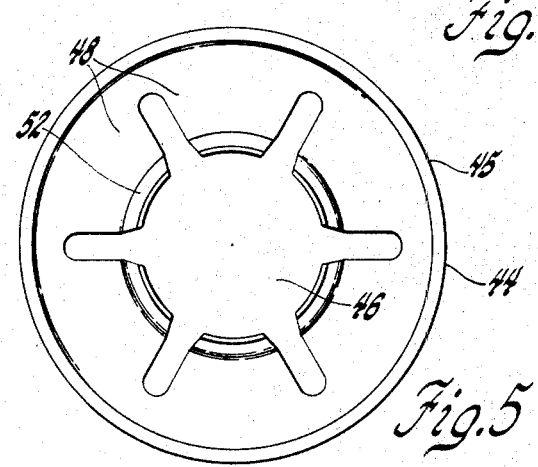
FIG. 5 is an elevational view of a part of the clearance take up bearing of the present invention.

With reference to FIGS. 2 and 5, it can be seen that the retainer means 34 comprises a pair of retainer rings 44 which are circumferentially retained about their peripheries 45 at axially spaced positions within the bearing housing 32. Each retainer ring 44 is generally dish-shaped and includes a circular peripheral portion 45 and a central opening 46. A plurality of circumferentially spaced fingers 48 extend radially inwardly from the peripheral portion 45 and into the central opening 46. Each of the fingers 48 has an arcuately formed tip portion 52 which, when the retainer rings are assembled within the bearing housing 32 define a bearing cage for the plain bearing 30 which is slightly over-sized with respect to the bearing 30.

Referring to FIG. 2, the split-ring, plain bearing 30 is generally spherical in shape and has a rounded outer periphery 54. The split-ring, plain bearing 30 comprises first and second members 56 and 57, both of which have generally flattened end portions 60. The first and second members 56 and 57 are of substantially the same shape and form and include openings 62 defined by inner surfaces 63 which extend completely through each of the members 56 and 57. The axes 62a of the openings 62 are slightly eccentric with respect to the axis 56a of the bearing members 56 and 57. The openings 62 are slightly over-sized, that is, they have a minimum diameter within their tolerance limitation range which is slightly greater than the maximum diameter of the shaft within the latter's tolerance limitation range. Opposite the flattened end portions 60, each of the first and second members 56 and 57 has a flat inclined end portion or surface 64 which defines a cam surface. The first and second members 56 and 57 of the plain bearing 30 are positioned within the over-sized cage defined by the tip portions 52 of the retainer rings 44 in substantially reversed positions and with the inclined end portions or cam surfaces 64 in complementary engagement with each other. Significantly, because the cage defined by the tip portion 52 of the retainer rings 44 is slightly over-sized, the first and second members 56 and 57 of the plain bearing 30 are retained axially and radially in a somewhat loose fashion which allows for both axial and radial play of the members 56 and 57.

The armature shaft 15 is received within the openings 62 of first and second members 56 and 57 of the plain bearing 30. The lower portion 15a of the armature shaft 15, because the openings 62 are axially eccentric and slightly over-sized, rests only upon the inner surface 62 of the first member 56 and the upper portion 15b of the armature shaft 15 is seen as supporting the second member 57 of the plain bearing 30 which rests thereon by force of gravity. When the armature 15 is inserted within the plain bearing 30 and, because the cage defined by the tip portions 52 of the retainer rings 44 is over-sized, the first and second members 56 and 57 have a tendency to align axially. The outer periphery 54 of the plain bearing 30 is supported or engaged by only the lower fingers 48 of the retainer spring 44 and is spaced apart from or out of engagement with the tip portions 52 of the upper fingers 48 of the retainer rings 44. Thus, although the first and second members 56 and 57 of the plain bearing 30 are engaged with opposite circumferential portions of the armature shaft 15, clearance exists between the first and second members 56 and 57 of the bearing 30 and the upper fingers 48 of the retainer rings 44 and, thus, the armature shaft 15 would be subject to radial play during operation of the machine 10 if the subject clearance were not taken up.

Referring to FIG. 2, it should be understood that the normal force on the inner surface 63 of the first member 56, because the weight of the armature 14 and the armature shaft 15 is acting downwardly thereon, is far in excess of the normal force on the inner surface 63 of the second member 57, which is merely resting by force of gravity upon the armature shaft 15. For this reason, the friction force tending to cause the first member 56 to rotate in response to rotation of the armature shaft 15 is greater than that tending to cause the second member 57 to rotate. Therefore, upon rotation of the armature shaft 15, the first member 56 of the plain bearing 30 is caused to rotate relative to the second member 57. Upon such relative rotation of the first and second members 56 and 57, the inclined end portions or cam surfaces 64 of the first and second members 56 and 57 cooperate to move the first and second members 56 and 57 axially apart and along the outer surface of the armature shaft 15. As this occurs, the outer peripheries 54 of the members 56 and 57 are caused to engage the tip portions 52 of the upper fingers 48 of opposite retainer rings 44. Thus, all radial and axial clearance between the plain bearing 30 and the retainer rings 44 is taken up. In this state, the lower portion 15a of the armature shaft 15 is firmly supported upon the inner surface 63 of the first member 56 and the tip portions of the upper fingers 48 of one of the retainer rings 44 urge the inner surface 63 of the second member 57 into firm engagement with the upper portion 15b of the armature shaft 15. Thus, the first and second members 56 and 57 of the plain bearing 30 are firmly engaged with substantially opposite circumferential portions of the armature shaft 15 and provide firm radial support for the armature shaft 15 during rotation thereof in order to prevent radial play.

The foregoing disclosure relates to only one embodiment of the present invention which may be modified within the scope of the appended claims.

What is claimed is:

1. A clearance take up bearing assembly for an armature shaft of a dynamoelectric machine, comprising: a bearing housing having axially spaced apart retainer means for defining a partially enclosed bearing case, a split-ring, bearing having two members with eccentric openings of a greater diameter than the diameter of the shaft, said members having adjacent inclined ends defining cam surfaces, said members normally being loosely retained both axially and radially between said retainer means of said bearing housing and with said cam surfaces in abutting engagement with each other and said annular openings being axially misaligned, one of said members normally supporting the lower portion of the shaft within its annular opening and the other of said members having the shaft received within its annular opening and said other member normally resting upon the upper portion of the shaft, said one member being rotated relative to said other member upon rotation of the shaft and said cam surfaces cooperating to move said members axially apart whereupon said retainer means restrains said members axially and radially and urges said members into engagement with substantially opposite circumferential portions of the shaft to radially support the shaft and prevent radial play of said shaft during rotation thereof.

2. In a dynamoelectric machine having a housing and a rotatable armature shaft, the improvement comprising: a clearance take up bearing assembly having a cylindrical, annular bearing housing supported within the housing of the machine; said bearing assembly also having a pair of axially spaced retainer rings circumferentially retained within said bearing housing, each of said retainer rings having a plurality of radially inwardly extending fingers with arcuately formed tip portions defining a bearing cage, said bearing assembly further having a split-ring bearing generally spherical in shape and comprising two separate and substantially identical members, said two members having eccentric openings therethrough through which the armature shaft is received, said eccentric openings having a minimum diameter within their range of tolerance limitations which is greater than the maximum diameter of the shaft within its range of tolerance limitations, said members having adjacent, flat inclined ends defining cam surfaces; said members being loosely supported axially and radially between said retainer rings and with said cam surfaces in complementary engagement with each other and with said openings being axially misaligned, one of said members supporting the lower portion of the armature shaft before rotation of the armature shaft, the other of said members resting upon the upper portion of the shaft before rotation thereof, said one member being rotated relative to said other member upon rotation of the armature shaft and said cam surfaces of said members cooperating to move said members axially apart whereupon said members engage said tip portions of said fingers and are restrained axially and radially whereby said retainer rings urge said members into engagement with substantially opposite circumferential portions of the armature shaft to radially support and prevent radial play of the armature shaft during rotation thereof.

* * * * *

PO-1050
(5/69)

UNITED STATES PATENT OFFICE
CERTIFICATE OF CORRECTION

Patent No. 3,770,990             Dated  November 6, 1973

Inventor(s)  Herbert E. Winkelmann

It is certified that error appears in the above-identified patent and that said Letters Patent are hereby corrected as shown below:

In the Abstract, line 11, after "within", "radially" should read -- the --;       line 22, "readially" should read -- radially --.

Signed and sealed this 7th day of May 1974.

(SEAL)
Attest:

EDWARD M. FLETCHER, JR.
Attesting Officer

C. MARSHALL DANN
Commissioner of Patents